(12) United States Patent
Martins et al.

(10) Patent No.: US 10,088,693 B2
(45) Date of Patent: Oct. 2, 2018

(54) OPHTHALMIC LENS, IN PARTICULAR FOR SUNGLASSES

(71) Applicant: BNL Eurolens, Bellegarde sur Valserine (FR)

(72) Inventors: Sébastien Martins, Apremont (FR); Didier Clerc, Eloise (FR); Franck Ledien, Echallon (FR)

(73) Assignee: BNL EUROLENS, Sur Valserine (FR)

( * ) Notice: Subject to any disclaimer, the term of this patent is extended or adjusted under 35 U.S.C. 154(b) by 54 days.

(21) Appl. No.: 15/012,241

(22) Filed: Feb. 1, 2016

(65) Prior Publication Data

US 2016/0223838 A1    Aug. 4, 2016

(30) Foreign Application Priority Data

Feb. 2, 2015 (FR) ...................... 15 50796

(51) Int. Cl.
| | | |
|---|---|---|
| *G02C 7/10* | (2006.01) | |
| *G02B 1/10* | (2015.01) | |
| *G02C 7/02* | (2006.01) | |
| *G02C 7/12* | (2006.01) | |

(52) U.S. Cl.
CPC .............. *G02C 7/10* (2013.01); *G02C 7/028* (2013.01); *G02C 7/104* (2013.01); *G02C 7/12* (2013.01); *G02C 2202/10* (2013.01)

(58) Field of Classification Search
CPC . G02C 7/12; G02C 7/10; G02C 7/028; G02C 7/104; G02C 2202/10; G02B 5/3033; G02B 1/10; B29D 11/0073
USPC ..................................................... 351/159.56
See application file for complete search history.

(56) References Cited

U.S. PATENT DOCUMENTS

| 5,149,183 A | 9/1992 | Perrott et al. |
| 5,413,971 A * | 5/1995 | McPherson ............... C03C 4/08 |
| | | 252/582 |
| 6,334,680 B1 * | 1/2002 | Larson ................... G02C 7/108 |
| | | 351/159.56 |
| 8,733,929 B2 * | 5/2014 | Chiou ...................... G02C 7/10 |
| | | 351/159.62 |

(Continued)

FOREIGN PATENT DOCUMENTS

| EP | 2 602 655 A1 | 6/2013 |
| FR | 2 990 774 | 11/2013 |

OTHER PUBLICATIONS

"International Standard ISO 12312-1." ISO 12312-1:2013. ISO, Aug. 1, 2013. Web. Apr. 20, 2016.*

*Primary Examiner* — Bumsuk Won
*Assistant Examiner* — Henry Duong
(74) *Attorney, Agent, or Firm* — Daly, Crowley, Mofford & Durkee

(57) ABSTRACT

An ophthalmic lens comprising a substrate is provided with the lens having a transmission spectrum such that the mean transmission value in the wavelength range between 380 nm inclusive and 780 nm inclusive is less than 60%, the mean transmission value at wavelengths less than or equal to 400 nm is less than 1%, the mean transmission value at wavelengths greater than 400 nm inclusive and less than 500 nm inclusive is less than 30% with a transmission minimum of less than 10% between 425 nm and 445 nm inclusive and the mean transmission value in the wavelength range between 400 nm and 500 nm has a first transmission maximum located between 405 nm and 425 nm.

16 Claims, 4 Drawing Sheets

(56) References Cited

U.S. PATENT DOCUMENTS

| | | |
|---|---|---|
| 2010/0149483 A1 | 6/2010 | Chiavetta, III |
| 2011/0141432 A1* | 6/2011 | Nesty .................... G02C 7/105 |
| | | 351/44 |
| 2014/0233105 A1* | 8/2014 | Schmeder ............... G01J 3/465 |
| | | 359/590 |
| 2016/0041408 A1* | 2/2016 | Carlson .................... G02C 7/10 |
| | | 351/159.56 |

* cited by examiner

Wavelength (nm)

| nm | T(%) | nm | T(%) | nm | T(%) | nm | T(%) | nm | T(%) |
|---|---|---|---|---|---|---|---|---|---|
| 1100 | 83,707 | 930 | 81,842 | 760 | 67,845 | 590 | 11,705 | 420 | 7,669 |
| 1090 | 84,425 | 920 | 81,058 | 750 | 66,824 | 580 | 12,369 | 410 | 3,516 |
| 1080 | 84,134 | 910 | 79,731 | 740 | 61,255 | 570 | 13,026 | 400 | 0,010 |
| 1070 | 84,493 | 900 | 80,253 | 730 | 46,727 | 560 | 13,582 | 390 | 0,000 |
| 1060 | 83,317 | 890 | 80,658 | 720 | 42,680 | 550 | 15,223 | 380 | 0,000 |
| 1050 | 83,886 | 880 | 79,961 | 710 | 47,279 | 540 | 11,084 | 370 | 0,000 |
| 1040 | 83,410 | 870 | 78,817 | 700 | 30,730 | 530 | 16,416 | 360 | 0,000 |
| 1030 | 83,560 | 860 | 78,029 | 690 | 27,611 | 520 | 12,673 | 350 | 0,000 |
| 1020 | 83,715 | 850 | 77,712 | 680 | 27,190 | 510 | 15,924 | 340 | 0,000 |
| 1010 | 83,098 | 840 | 76,881 | 670 | 18,000 | 500 | 18,277 | 330 | 0,000 |
| 1000 | 83,157 | 830 | 76,474 | 660 | 18,982 | 490 | 19,074 | 320 | 0,000 |
| 990 | 82,953 | 820 | 75,572 | 650 | 15,417 | 480 | 19,375 | 310 | 0,000 |
| 980 | 82,925 | 810 | 74,600 | 640 | 12,751 | 470 | 16,823 | 300 | 0,000 |
| 970 | 83,049 | 800 | 73,274 | 630 | 16,196 | 460 | 17,733 | 290 | 0,000 |
| 960 | 82,495 | 790 | 71,529 | 620 | 15,197 | 450 | 13,964 | 280 | 0,000 |
| 950 | 82,264 | 780 | 69,908 | 610 | 12,069 | 440 | 4,121 | | |
| 940 | 82,119 | 770 | 68,460 | 600 | 11,296 | 430 | 1,031 | | |

| nm | T(%) | nm | T(%) | nm | T(%) | nm | T(%) | nm | T(%) |
|---|---|---|---|---|---|---|---|---|---|
| 1100 | 89,110 | 930 | 88,954 | 760 | 81,845 | 590 | 22,298 | 420 | 4,480 |
| 1090 | 89,409 | 920 | 88,579 | 750 | 80,824 | 580 | 22,231 | 410 | 1,215 |
| 1080 | 90,932 | 910 | 87,780 | 740 | 76,255 | 570 | 20,943 | 400 | 0,012 |
| 1070 | 90,666 | 900 | 88,079 | 730 | 67,727 | 560 | 18,821 | 390 | 0,000 |
| 1060 | 89,884 | 890 | 88,347 | 720 | 63,680 | 550 | 17,115 | 380 | 0,000 |
| 1050 | 89,659 | 880 | 88,003 | 710 | 60,279 | 540 | 13,645 | 370 | 0,000 |
| 1040 | 89,705 | 870 | 87,287 | 700 | 42,730 | 530 | 15,258 | 360 | 0,000 |
| 1030 | 89,684 | 860 | 87,245 | 690 | 40,611 | 520 | 11,804 | 350 | 0,000 |
| 1020 | 89,811 | 850 | 87,287 | 680 | 34,190 | 510 | 11,731 | 340 | 0,000 |
| 1010 | 89,330 | 840 | 87,089 | 670 | 28,000 | 500 | 11,372 | 330 | 0,000 |
| 1000 | 89,365 | 830 | 86,686 | 660 | 28,992 | 490 | 10,509 | 320 | 0,000 |
| 990 | 89,319 | 820 | 86,344 | 650 | 27,417 | 480 | 9,880 | 310 | 0,000 |
| 980 | 89,443 | 810 | 85,796 | 640 | 23,751 | 470 | 8,921 | 300 | 0,000 |
| 970 | 89,548 | 800 | 85,091 | 630 | 27,198 | 460 | 8,353 | 290 | 0,000 |
| 960 | 89,472 | 790 | 84,239 | 620 | 27,197 | 450 | 7,122 | 280 | 0,000 |
| 950 | 89,310 | 780 | 83,426 | 610 | 23,069 | 440 | 1,814 | | |
| 940 | 89,314 | 770 | 82,529 | 600 | 22,386 | 430 | 0,440 | | |

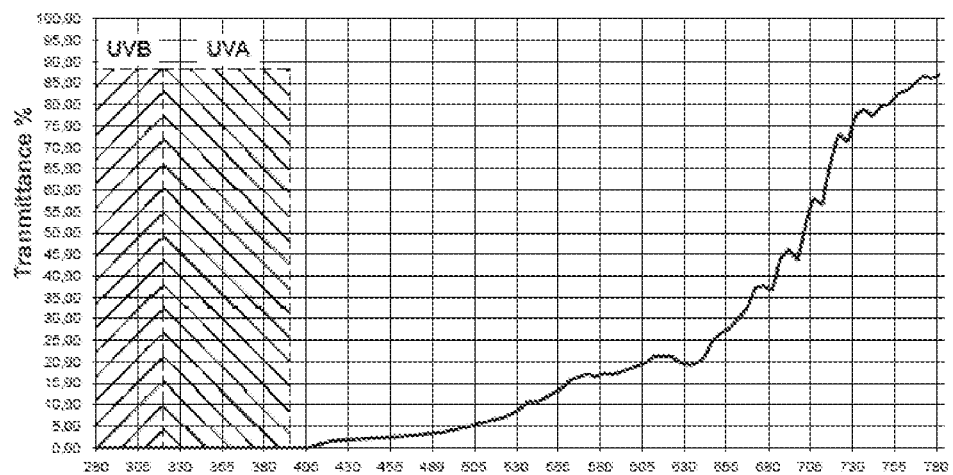
Wavelength (nm)
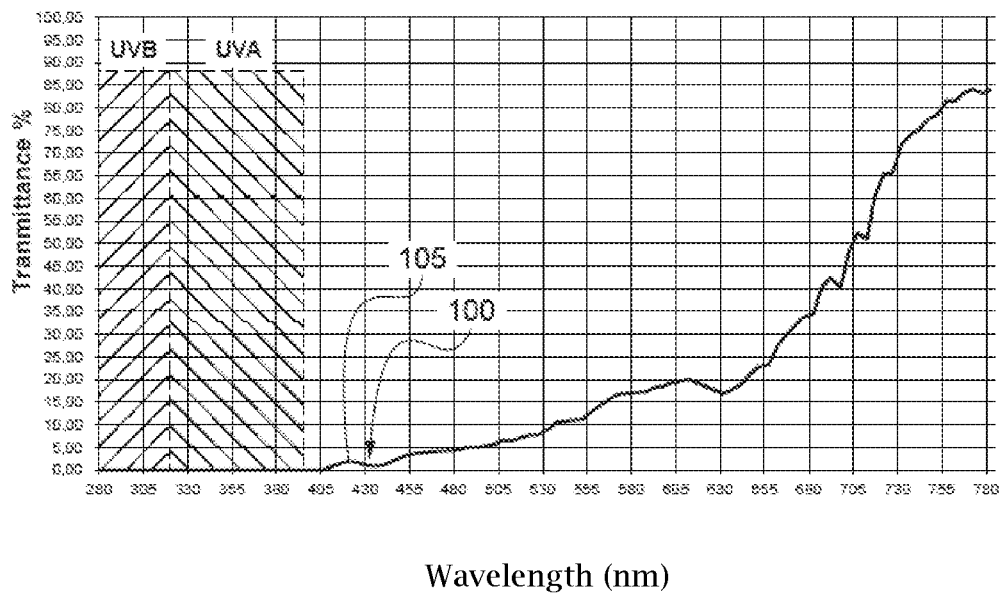
Wavelength (nm)

OPHTHALMIC LENS, IN PARTICULAR FOR SUNGLASSES

RELATED APPLICATION

This application claims priority to French application FR1550796 filed Feb. 2, 2015.

TECHNICAL FIELD

The present invention relates to an ophthalmic lens, in particular for sunglasses.

BACKGROUND

The wearing of sunglasses, in particular in very bright light, is medically highly recommended for protecting long-term vision potential and also for safety reasons, for example when driving.

Specifically, sunglasses form a barrier to UV rays. Many studies have shown that UV rays may cause lesions, inflammations or deteriorations of the cornea, of the crystalline lens or of the retina. In order to prevent these effects and above all a modification of the eye which may reduce long-term vision, people are increasingly encouraged to wear sunglasses to prevent exposure to a too high light intensity.

Furthermore, sunglasses also make it possible to combat glare, which increases safety when driving or during sporting activities.

This is why sunglasses generally sold today block any radiation having a wavelength of less than 400 nm.

However, medical studies in recent years have shown that a wavelength range around 435 nm (±20 nm), also known under the name "bad blue light", plays an important role, for example in age-related macular degeneration (AMD). This is a process which is cumulative over a lifetime and which becomes troublesome in particular for people over 60 years old.

In order to solve these problems, ophthalmic lenses are known that have filtering properties in the visible blue part of the spectrum between 400 nm and 480 nm.

However, these known ophthalmic lenses are not completely satisfactory in so far as a portion of the "good blue light" between 450 nm and 480 nm is also significantly attenuated, which is detrimental to the visual spectral perception of the sunglasses wearer. Furthermore, a deterioration of the contrast perceived by the user is observed, which may be a safety drawback, in particular for driving.

Documents U.S. Pat. No. 5,149,183, EP 2 602 655, FR 2 990 774, and US2010/149483 relate to ophthalmic lenses belonging to the state of the art.

The objective of the invention is therefore to propose an improved ophthalmic lens that makes it possible to at least partially solve the drawbacks of the prior art.

SUMMARY

For this purpose, one subject of the invention is an ophthalmic lens comprising a substrate, said lens having a transmission spectrum such that:

the mean transmission in the wavelength range between 380 nm inclusive and 780 nm inclusive (meaning within the wavelength range [380 nm; 780 nm]) is less than 60%;

the mean transmission at wavelengths less than or equal to 400 nm is less than 1%, preferably less than 0.5%, very preferably less than 0.1%;

the mean transmission at wavelengths greater than 400 nm inclusive and less than 500 nm inclusive (meaning within the wavelength range [400 nm; 500 nm]) is less than 30% with a transmission minimum of less than 10%, preferably less than 5%, very preferably less than 1% between 425 nm and 445 nm inclusive (meaning within the wavelength range [425 nm; 445 nm]).

Owing to these properties, the ophthalmic lens according to the invention is capable of filtering out the wavelengths corresponding to ultraviolet light, but also the wavelengths corresponding to bad blue light, with great effectiveness, and therefore of protecting the wearer's eye, while preserving the colorimetric characteristics of the lens. Indeed, although cutting out the bad blue light, the lens allows a sufficient transmission of blue light, in particular with respect to the spectrum for perception of colour by the eye. Furthermore, it makes it possible to have a glass with a colour comprising blueish shades since not all the blue light is cut out.

Finally, the ophthalmic lenses intended for sunglasses must meet certain criteria relating to the perception of colours by the wearer. In particular, such lenses must comply with the ISO 12312-1: 2013 and/or ANSI Z80.3-2001 standards which define criteria for the wearing thereof within the context of a vehicle driving activity. Thus the ophthalmic lenses for sunglasses should in particular not modify the perception of the colour of traffic signals.

The ophthalmic lenses according to the invention thus guarantee, by virtue of their transmission spectrum, an excellent protection for a wearer owing to the simultaneous combination of the following factors:

reduced transmission over the whole of the visible spectrum owing to their solar characteristics, absorption of the UV wavelengths, very highly effective absorption of the bad blue light, maintaining a transmission in the "good blue light" and compliance with the ISO12312-1: 2013 and/or ANSI Z80.3-2001 standards thus offering safety when worn during a vehicle driving activity.

The ophthalmic lens may have one or more of the following features:

The mean transmission in the wavelength range between 400 nm and 500 nm has, for example, a first transmission maximum located between 405 nm and 425 nm.

According to one aspect, the first maximum located between 405 nm and 425 nm is at least six times higher than the transmission of the first transmission minimum.

According to another aspect, the percentage of transmission of the first maximum is at least two times higher than the percentage of transmission of the first minimum, the percentage of transmission of the first maximum having a percentage of transmission being at least the value of transmission of the first transmission minimum increased by a percentage value of 2%.

According to a further aspect the first maximum is in percentage at least 2%, preferentially 4% higher than the percentage of transmission of the first minimum of transmission.

According to one aspect, the first minimum is located at 435 nm with an accuracy of ±5 nm, preferably with an accuracy of ±2 nm.

According to another aspect, the first minimum is an absorption peak with a degree of absorption of greater than 95% and preferably greater than 99.5%.

The absorption peak may have a quarter-height width of 50 nm or less, and a half-height width of 30 nm or less, and a width at two thirds of the height of the absorption peak of 20 nm or less.

According to yet another aspect, the transmission at the first maximum is greater than 1%, preferably greater than 4%.

According to another aspect, the transmission in the wavelength range between 440 nm and 500 nm increases.

The mean transmission between 380 and 780 nm inclusive may be less than 35%, in particular less than 25% and preferably less than 18%.

The mean transmission between 400 nm and 450 nm is, for example, less than the mean transmission between 450 nm and 650 nm and the mean transmission between 450 nm and 650 nm is, for example, less than the mean transmission between 650 nm and 780 nm.

According to another aspect, the ophthalmic lens is suitable for driving according to the ISO 12312-1: 2013 standard.

The ophthalmic lens may comprise a polarizing assembly.

The substrate comprises, for example, a thermoplastic material, in particular polycarbonate.

The invention also relates to a process for optimizing a colour of an ophthalmic lens with a view to conformity with the ISO 12312-1: 2013 standard relative to a given spectrum, in which the transmission of the lens in the range between 405 nm and 425 nm on the one hand and between 440 nm and 450 nm on the other hand is increased and the transmission in the wavelength range between 430 nm and 440 nm is decreased.

BRIEF DESCRIPTION OF THE DRAWINGS

Other features and advantages of the invention will appear more clearly on reading the following description, given by way of illustrative and non-limiting example, and from the appended drawings showing:

FIG. 4 is a graph showing a comparative example of the transmittance of an ophthalmic lens according to the state of the art as a function of the wavelength, and FIG. 5 is a graph showing the transmittance of a third example of an embodiment of an ophthalmic lens as a function of the wavelength.

On all the figures, identical elements bear the same reference numbers.

DETAILED DESCRIPTION

An example of an embodiment will now be described with reference to the figures.

The following embodiments are examples. Although the description refers to one or more embodiments, this does not necessarily mean that each reference relates to the same embodiment, or that the features apply only to a single embodiment. Simple features of various embodiments may also be combined and/or interchanged to provide other embodiments.

For the mean transmission between two wavelengths $\lambda_1$ and $\lambda_2$, the ISO 11664-1 and ISO 11664-2 definitions are, for example, taken into account.

More specifically, the mean transmission may be defined as:

$$\tau_v = 100 \times \frac{\int_{\lambda_1}^{\lambda_2} \tau(\lambda) S_{D65}(\lambda) V(\lambda) d\lambda}{\int_{\lambda_1}^{\lambda_2} \tau(\lambda) S_{D65}(\lambda) V(\lambda) d\lambda}$$

where $\lambda$ is the wavelength in nanometers, $\tau(\lambda)$ is the spectral transmittance of the lens, $V(\lambda)$ is the spectral luminous efficiency function for vision, $S_{D65}(\lambda)$ is the spectral distribution according to the CIE standard (see ISO 11664-2).

In the present description, the expression «inclusive» is meant to include also the limits or borders that will also belong to the designated range. For example a wavelength between «425 nm and 445 nm inclusive», it is meant that the wavelength range also comprises the border values ([425 nm, 445 nm]). In this way, it is defined a wavelength range from a wavelength superior or equal to 425 nm up to inferior or equal to 445 nm.

Figure 1:
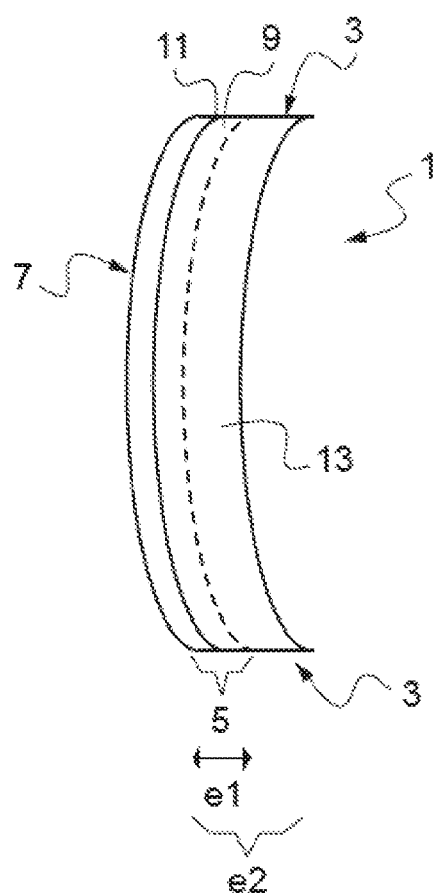
FIG. 1 is an example of an ophthalmic lens according to the invention.

FIG. 1 is a schematic cross-sectional view of an exemplary embodiment of an ophthalmic lens 1 according to the invention.

This ophthalmic lens 1 is tinted and is for example intended to be used for spectacles, in particular sunglasses. For this, it is only necessary to shape the outer edge 3 to the desired shape of the rim of the frame.

An ophthalmic lens is understood to mean a finished or semi-finished corrective or non-corrective lens, capable of being mounted in a frame, for example a spectacle frame, a mask and a visor.

The solar ophthalmic lens may or may not be tinted, or may have a tint gradient, and it may comprise other solar functions such as a polarizing or photochromic function, alone or in combination.

It may also comprise other additional functions, alone or in combination, from the following non-exhaustive list: impact-resistant, scratch-resistant, abrasion-resistant, anti-reflective, mirror, anti-soiling, anti-fogging and antistatic functions. These additional functions may be produced according to conventional methods (dip coating, vacuum deposition, spin coating, spray coating, etc.).

The tinted ophthalmic lens 1 comprises, for example, a polarizing assembly 5 composed of at least one first layer 7 and one second layer 9 of a thermoplastic or thermosetting material sandwiching a polarizing film 11. Of course, this polarizing assembly 5 with its layers 7, 9 and 11 is optically transparent, that is to say that it lets light pass through.

As can be seen in FIG. 1, the ophthalmic lens 1 additionally comprises at least one third layer forming a substrate 13 of a thermoplastic material, for example made of polycarbonate, which is transparent, tinted or coloured, adhering by injection moulding to the second layer 9.

By way of example, the polarizing assembly 5 has a thickness e1 of between 0.3 and 1 mm and the third layer forming a substrate 13 has a thickness e2 of between 0.5 and 2 mm.

The polarizing film is, for example, a film of polyvinyl alcohol (PVA) known for its polarizing properties.

For a glasses use, the layer 13 will be the one intended to be closest to the user's eye and the layer 7 will be the one furthest from the user's eye.

As mentioned above, the two layers 7, 9 may be made of a thermoplastic or thermosetting material, and the layer 13 may be made of a thermoplastic material.

As a thermoplastic material, it is possible, for example, to choose from the following group: polymethyl (meth) acrylate, polycarbonate, polycarbonate/polyester blends, polyamide, polyester, cyclic olefin copolymers, polyurethane, polysulphone, TAC (cellulose triacetate) and a combination thereof.

As thermosetting material, it is possible, for example, to use a transparent material such as CAB (cellulose acetate butyrate).

In order to colour the thermoplastic material, it is possible to add pigments or colourants. These may be organic or mineral pigments. Among these, there is in particular the pigment sold under the reference ABS549 by EXCITON (registered trademark) which is a specific absorber of narrow wavelength width.

Figure 2:
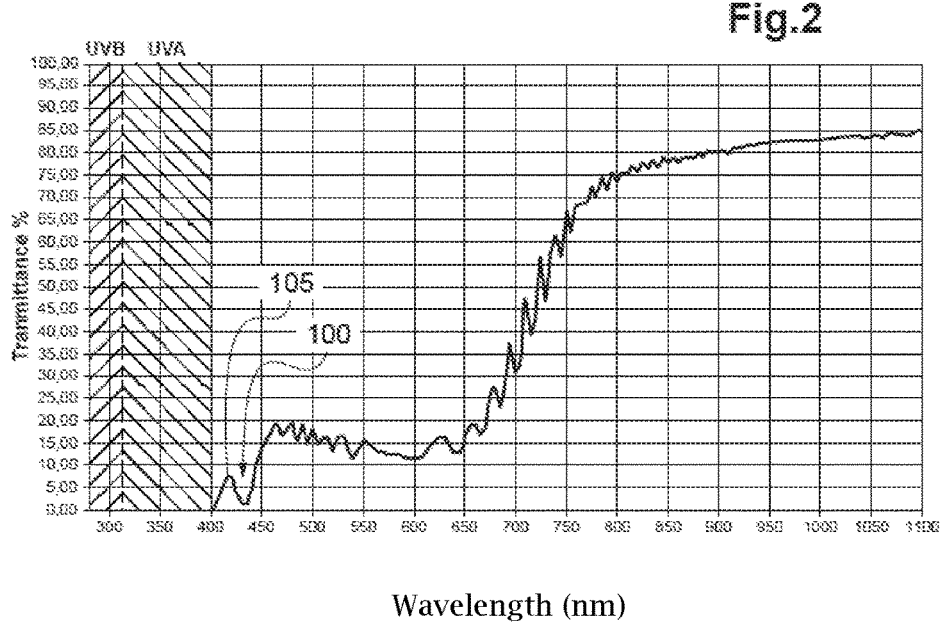
FIG. 2 is a graph showing the transmittance of a first example of an embodiment of an ophthalmic lens according to the invention as a function of the wavelength.
Figure 3:
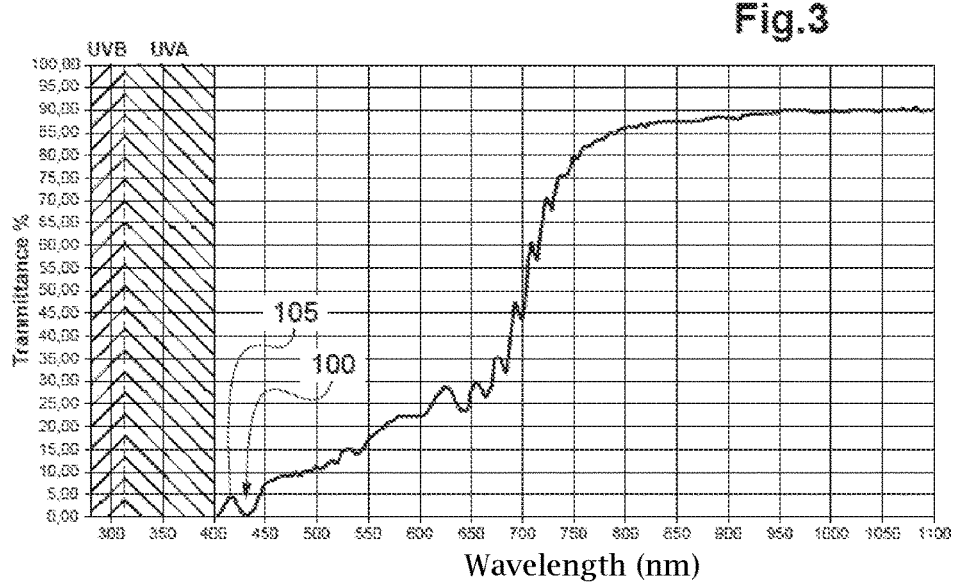
FIG. 3 is a graph showing the transmittance of a second example of an embodiment of an ophthalmic lens according to the invention as a function of the wavelength.

In the present case, the substrate formed by the layer 13 comprises several colourants, especially ABS549, which cooperate together in order to absorb the light passing through the lens, the lens having a transmission spectrum such that, as is seen in FIGS. 2 and 3 that show two examples of spectra, one for a glass of grey colour when seen by an external observer (FIG. 2) and the other for a glass of brown colour when seen by an external observer (FIG. 3):

the mean transmission in the wavelength range between 380 nm inclusive and 780 nm inclusive is less than 60%;

the mean transmission at wavelengths less than or equal to 400 nm is less than 1%, preferably less than 0.5%, very preferably less than 0.1%;

the mean transmission at wavelengths greater than 400 nm inclusive and less than 500 nm inclusive is less than 30% with a transmission minimum denoted by the reference 100 of less than 10%, preferably less than 5%, very preferably less than 1% between 425 nm and 445 nm inclusive.

Furthermore, the transmission at wavelengths between 405 nm and 425 nm which is non-zero has a first transmission maximum denoted by the reference 105 which is at least 100% greater than the transmission at the first transmission minimum 100.

The first maximum 105 is at least six times greater than the transmission of the first transmission minimum 100.

The transmission at the first minimum 100 is less than 5%, preferably less than 0.5% (for the version of the spectrum from FIG. 3).

The first minimum 100 is an absorption peak with a degree of absorption of greater than 95% and preferably greater than 99.5%.

In greater detail, the absorption peak 100 has a quarter-height width of 50 nm or less, and a half-height width of 30 nm or less, and a width at two thirds of the height of the absorption peak 100 of 20 nm or less.

The half-height is found at the location where the absorption is half the maximum absorption. The quarter-height is found at the location where the absorption is a quarter of the maximum absorption. The two-thirds height is found at the location where the absorption is two thirds of the maximum absorption.

The first minimum 100 is located at 435 nm with an accuracy of ±5 nm, preferably with an accuracy of ±2 nm. It is therefore seen that the bad blue light is indeed filtered by the lens 1 according to the invention while transmitting at least one portion of the blue wavelengths of the visible light spectrum, which is not harmful for the human eye and can therefore be used for safe vision. It is therefore understood that in this way a lens is obtained that gives better eye protection while resulting in only a small, reduced and in some cases nearly imperceptible deformation of the perception of contrasts and colours.

The transmission at the first maximum 105 is greater than 1%, preferably greater than 4%.

The transmission in the wavelength range between 440 nm and 500 nm increases in particular for the "brown" version from FIG. 3.

Depending on the sunglasses category, the mean transmission between 380 and 780 nm inclusive is less than 35%, in particular less than 25% for category 2 and preferably less than 18% for category 3.

For the two examples from FIGS. 2 and 3, the mean transmission between 400 nm and 450 nm is less than the mean transmission between 450 nm and 650 nm and the mean transmission between 450 nm and 650 nm is less than the mean transmission between 650 nm and 780 nm.

As regards the "brown" version from FIG. 3, the mean transmission between 400 nm and 500 nm is less than the mean transmission between 500 nm and 650 nm and the mean transmission between 500 nm and 650 nm is less than the mean transmission between 650 nm and 780 nm.

As from the colorimetry point of view, the colorimetric characteristics of the colorimetric CIE model may be the following: L between 36.0 and 37.0, in particular 36.83, a between 6.0 and 7.5, in particular 6.91, and b between 18.0 and 19.5, in particular 18.95.

Furthermore, the ophthalmic lens is thus suitable for driving according to the ISO 12312-1: 2013 standard.

FIG. 4 shows as an example the transmittance of an ophthalmic lens according to the state of the art as a function of the wavelength. This lens is of brown colour when seen by an external observer. The measurements of the features of this lens have shown that this lens is not suitable for driving.

However, one may proceed thanks to the invention to an optimization of the colour of such an ophthalmic lens in view of its conformity to the ISO 12312-1: 2013 with respect to the spectrum given in FIG. 4 for example, by increasing, with respect to the reference curve for example in FIG. 4 the transmission of the lens in the wavelength ranges located between 405 nm et 425 nm on the one hand and between 440 nm et 450 nm on the other hand, and in decreasing the transmission in the wavelength range located between 430 nm et 440 nm.

One may get in this way a lens having a transmittance curve as represented in FIG. 5 which shows a graph showing the transmittance of a third example of an embodiment of an ophthalmic lens as a function of the wavelength. The measurements of the features of this lens have shown that this lens is suitable for driving and this without that the perception of the colour of the tinted lens by an external observer has changed.

It is therefore clearly understood that the ophthalmic lenses according to the invention make it possible to protect the human eye more effectively against bad blue light without the non-harmful portion of the blue light being excessively attenuated.

It is in particular possible to observe in FIGS. 2, 3 and 5 that the transmission in the wavelength range between 400 nm and 500 nm presents a first transmission maximum 105 located between 405 nm and 425 nm that shows
- to be at least six times higher than the transmission of the first transmission minimum 100, or
- to have a percentage of transmission that is at least two times higher than the percentage of transmission of the first minimum 100, the percentage of transmission of the first maximum 105 having a percentage of transmission being at least the value of transmission of the first transmission minimum increased by a percentage value of 2%, or
- to be in percentage at least 2%, preferentially 4% higher than the percentage of transmission of the first minimum of transmission 100.

By the condition that the percentage of transmission of the first maximum 105 is at least two times higher than the percentage of transmission of the first minimum 100, the percentage of transmission of the first maximum 105 having a percentage of transmission being at least the value of transmission of the first transmission minimum increased by a percentage value of 2%, it is meant that if $T_{min1}$ is the value of transmittance of the first transmission minimum 100 and $T_{max1}$ is the value of transmission of the first transmission maximum 105, $T_{max1} > 2*T_{min1}$ et $T_{max1} > T_{min1} + 2\%$.

By the condition, that the percentage of the first maximum 105 is at least 2%, preferentially 4% higher than the percentage of transmission of the first minimum of transmission 100, it is meant that $T_{max1} > T_{min1} + 2\%$., in particular $T_{max1} > T_{min1} + 4\%$.

According to the example in FIG. 3, the first transmission minimum 100 exhibits a transmission value of 0.44% and the first transmission maximum 105 of 4.48%.

In this case, the transmission the first transmission maximum 105 is 10.2 times higher than the transmission of the first transmission minimum 100.

The difference between the transmission of the first transmission maximum 105 and the first transmission minimum is 4.04% (=4.48%-0.44%) and thus the transmission of the first transmission maximum 105 is at least two times higher than the percentage of transmission of the first minimum 100, the percentage of transmission of the first maximum 105 having a percentage of transmission being at least the value of transmission of the first transmission minimum increased by a percentage value of 2% (in this case by 4.04%).

The percentage of the first maximum 105 is thus more than 4% higher than the percentage of transmission of the first minimum of transmission 100.

Other variants are possible without departing from the scope of the present invention. Thus, the substrate, the layer 13 may be shaped to furthermore provide an optical correction to the vision of the user.

The layer 13 may be sandwiched between the polarizing assembly and another layer, for example made of clear or coloured polycarbonate. In this case, it may be the latter layer which is cut/polished in order to provide an optical correction and not the layer 13.

What is claimed is:

1. Ophthalmic lens comprising a substrate, said ophthalmic lens having a transmission spectrum such that:
   - a mean transmission value in the wavelength range between 380 nm inclusive and 780 nm inclusive is less than 60%;
   - a mean transmission value at wavelengths less than or equal to 400 nm is less than 1%;
   - a mean transmission value at wavelengths greater than 400 nm inclusive and less than 500 nm inclusive is less than 30%, wherein a lowest transmission value for a range of wavelengths greater than 410 nm inclusive and less than 500 nm inclusive occurs between 425 nm and 445 nm inclusive, and wherein the lowest transmission value has a transmittance of less than or equal to 1%; and
   - a mean transmission value in the wavelength range between 400 nm and 500 nm has a first transmission maximum located between 405 nm and 425 nm.

2. Ophthalmic lens according to claim 1, wherein the first maximum located between 405 nm and 425 nm is at least six times higher than the lowest transmission value.

3. Ophthalmic lens according to claim 1, wherein the percentage of transmission of the first transmission maximum is at least two times higher than the percentage of transmission of the lowest transmission value, the percentage of transmission of the first transmission maximum having a percentage of transmission being at least the value of transmission of the lowest transmission value increased by a percentage value of 2%.

4. Ophthalmic lens according to claim 1, wherein the lowest transmission value is located at 435 nm with an accuracy of ±5 nm.

5. Ophthalmic lens according to claim 1, wherein the lowest transmission value is an absorption peak with a degree of absorption of greater than 95%.

6. Ophthalmic lens according to claim 5, wherein the absorption peak has a quarter-height width of 50 nm or less, and a half-height width of 30 nm or less, and a width at two thirds of the height of the absorption peak of 20 nm or less.

7. Ophthalmic lens according to claim 1, wherein the transmission at the first transmission maximum is greater than 1%.

8. Ophthalmic lens according to claim 1, wherein the transmission in the wavelength range between 440 nm and 500 nm increases.

9. Ophthalmic lens according to claim 1, wherein the mean transmission between 380 and 780 nm inclusive is less than 35%.

10. Ophthalmic lens according to claim 1, wherein the mean transmission between 400 nm and 450 nm is less than the mean transmission between 450 nm and 650 nm and the mean transmission between 450 nm and 650 nm is less than the mean transmission between 650 nm and 780 nm.

11. Ophthalmic lens according to claim 1, wherein it comprises a polarizing assembly.

12. Ophthalmic lens according to claim 1, wherein the substrate comprises a thermoplastic material, in particular polycarbonate.

13. Ophthalmic lens according to claim 1, wherein the first transmission maximum is in percentage at least 2% higher than the percentage of transmission of the lowest transmission value.

14. Ophthalmic lens according to claim 1, wherein the lowest transmission value for the range of wavelengths greater than 410 nm inclusive and less than 500 nm inclusive occurs between 433 nm and 437 nm inclusive.

15. A process for optimizing a color of an ophthalmic lens comprising:
   increasing a transmission value of ophthalmic lens in the range between 405 nm and 425 nm;
   decreasing the transmission value of the ophthalmic lens in the range between 430 nm and 440 nm, such that in a range of wavelengths greater than 410 nm inclusive and less than 500 nm inclusive, there exists a lowest transmission value between 430 nm and 440 nm inclusive, and wherein the lowest transmission value has a transmittance of less than or equal to 1%; and increasing the transmission value of the ophthalmic lens in the range between 440 nm and 450 nm.

16. The process of claim 15, wherein the lowest transmission value for the range of wavelengths greater than 410 nm inclusive and less than 500 nm inclusive occurs between 433 nm and 437 nm inclusive.

\* \* \* \* \*